United States Patent
Imamura

(10) Patent No.: US 6,188,879 B1
(45) Date of Patent: Feb. 13, 2001

(54) SYSTEM AND METHOD OF TESTING OVERALL AND INDIVIDUAL ANTENNAS OF A SWITCHED SPACE DIVERSITY RECEIVER

(75) Inventor: Tomoyasu Imamura, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/229,572

(22) Filed: Jan. 13, 1999

(30) Foreign Application Priority Data

Jan. 14, 1998 (JP) .................................................. 10-017682

(51) Int. Cl.[7] ................................ H04B 1/06; H04B 7/00
(52) U.S. Cl. ..................................... 455/277.1; 455/277.2; 455/562
(58) Field of Search ................................. 455/277.1, 272, 455/562, 13.3, 25, 561, 107, 269, 273; 342/368; 343/725, 824; 370/334, 332

(56) References Cited

U.S. PATENT DOCUMENTS

| 5,367,484 | 11/1994 | Alexander et al. ................... 365/185 |
| 5,603,001 | 2/1997 | Sukegawa et al. ................... 395/430 |
| 5,603,089 | * 2/1997 | Searle et al. .......................... 455/507 |
| 5,969,689 | * 10/1999 | Martek et al. ........................ 343/758 |
| 5,973,638 | * 10/1999 | Robbins et al. ...................... 342/172 |
| 6,032,033 | * 2/2000 | Morris et al. ....................... 455/277.2 |
| 6,038,459 | * 3/2000 | Searle et al. .......................... 455/562 |
| 6,091,788 | * 7/2000 | Keskitalo et al. .................... 375/347 |

FOREIGN PATENT DOCUMENTS

| 533 608 A2 | 3/1993 | (EP) . |
| 62-43925 | 2/1987 | (JP) . |
| 06-276166 | 9/1994 | (JP) . |
| 7-302175 | 11/1995 | (JP) . |
| 7-302176 | 11/1995 | (JP) . |
| 9-83418 | 3/1997 | (JP) . |
| 09-172399 | 6/1997 | (JP) . |
| 09-289482 | 11/1997 | (JP) . |

* cited by examiner

Primary Examiner—Nay Maung
Assistant Examiner—Sonny Trinh
(74) Attorney, Agent, or Firm—Sughrue, Mion, Zinn, Macpeak & Seas, PLLC

(57) ABSTRACT

In a diversity receiving system for receiving modulated RF signals using an array of antennas and recovering information signals from the modulated signals, the information signal of the highest strength is selected to allow a connection to be established from a transmit site. Strength data of the selected signal is stored in a corresponding one of memory locations respectively mapped to the antennas. Strength data stored in the memory locations are analyzed. If none of the strength data exceeds a threshold value, a first alarm is given of the whole array of antennas. If at least one strength data exceeds the threshold, the memory locations are tested to see if there is at least one vacant memory location which contains no strength data. If such a vacant location exists, a second alarm is given of the antenna that is mapped to the vacant location. In a modified embodiment, the stored strength data are counted to produce a number of respective counts for the memory locations if at least one strength data exceeds the threshold value, and the difference between a maximum and a minimum value of the counts is determined. If the difference is greater than a predetermined value, the second alarm is given of the antenna that is mapped to the memory location having the minimum count value.

6 Claims, 3 Drawing Sheets

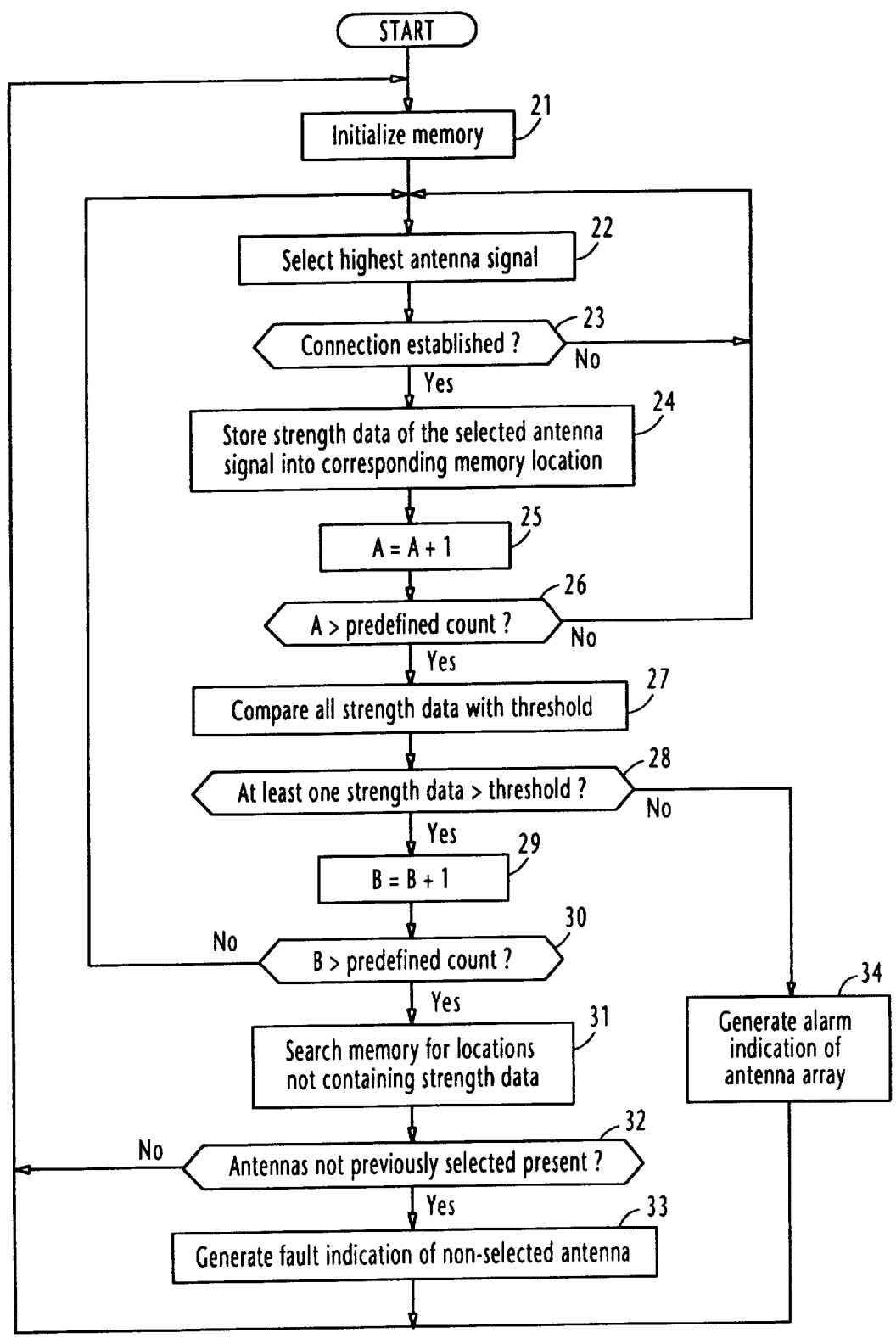

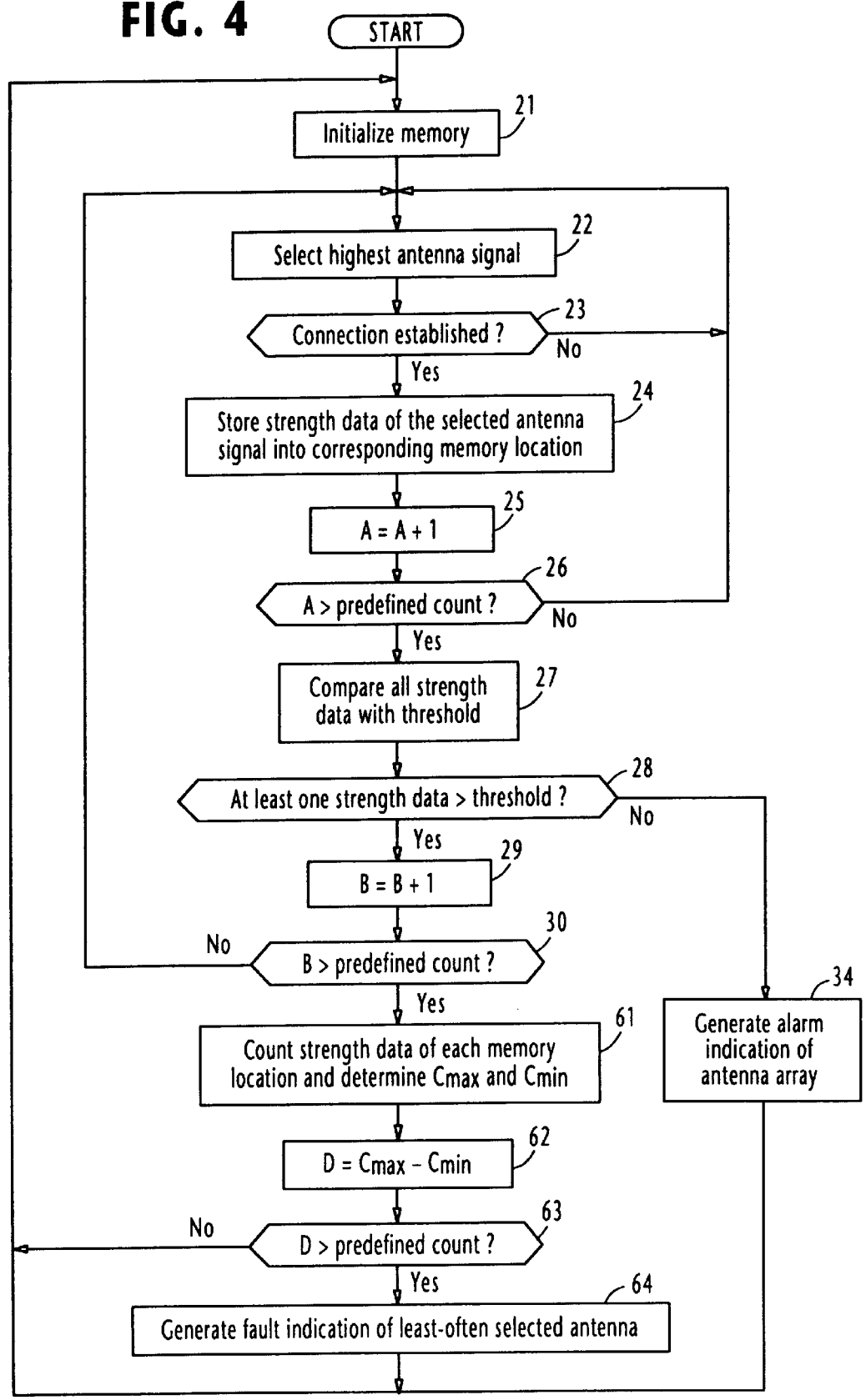

SYSTEM AND METHOD OF TESTING OVERALL AND INDIVIDUAL ANTENNAS OF A SWITCHED SPACE DIVERSITY RECEIVER

BACKGROUND OF THE INVENTION

1. Field of the Invention

The present invention relates generally to the diversity reception of a transmitted signal using an array of antennas, and more specifically to the performance assessment of an array of antennas in a switched space diversity receiving system.

3. Description of the Related Art

Diversity combining is used in a space-diversity technique for combining signals received via independent propagation paths in such a way that a high signal to noise ratio is achieved. This technique is suitable for applications where a deep fade occurs in the propagation paths. However, if the fading pattern of a propagation path is obscure such as the one that occurs frequently during a cellular mobile communication, diversity combining technique is not suitable. In such instances, a switched space diversity technique is employed for selecting the highest of the received signals.

A fault detection technique for an array of antennas is disclosed in Japanese Laid-Open Patent Specification Hei-9-83418. According to this prior art, signals from an array of antennas are monitored to determine their strength values and the highest value is selected as a reference. Differences between the strength value of the antennas and the reference are determined respectively for the antennas and then compared with a threshold. Counters are associated respectively with the antennas. If one of the difference values exceeds the threshold, the counter associated with that difference value is incremented. This counter is reset to zero whenever that difference value is lower than the threshold. If the counter has been incremented to a value exceeding some critical value, an alarm indication is given that the antenna associated with this counter is not functioning properly.

However, the detection of performance degradation of a whole array of antennas, rather than with individual antennas, is also important. Although detecting electromagnetic reflections from the antennas or subjecting them to switching between a d.c. short-circuit and an open- circuit condition would be one solution, the hardware installation cost cannot economically be justified.

SUMMARY OF THE INVENTION

It is therefore an object of the present invention to provide a switched space diversity receiver capable of determining performance degradation of a whole antenna array as well as faulty individual antennas without hardware installation.

According to a first aspect of the present invention, there is provided a diversity receiving system comprising an array of antenna systems for receiving modulated radio-frequency signals via a plurality of independent propagation paths and respectively recovering information signals from the modulated signals, a plurality of detectors connected respectively to the antenna systems for producing strength data indicating respective strengths of the information signals, a diversity switch, and call processing circuitry connected to the diversity switch for establishing a connection from a transmit site. A diversity controller is provided for selecting a highest strength signal from the information signals and controlling the diversity switch to supply the selected information signal to the call processing circuitry. Further provided is a memory having a plurality of locations respectively mapped to the antennas. The diversity controller is responsive to each connection established by the call processing circuitry for storing the strength data of the selected signal in a corresponding one of the memory locations. The diversity controller analyzes the contents of the memory locations when a predetermined number of strength data are stored, and generates an alarm indication of the whole array of antenna systems if none of the strength data exceeds a threshold value. If at least one strength data exceeds the threshold value, the memory locations are tested to see if there is at least one vacant location which contains no strength data. If such a vacant location is detected, an alarm indication is given of the antenna that is mapped to the vacant location.

According to a second aspect of the present invention, the diversity controller is arranged to compare all strength data stored in the memory locations with a threshold value when the predetermined number of strength data are stored in the memory, generate an alarm indication of the whole array of antenna systems if none of the strength data exceeds the threshold value, count strength data stored in each memory location to produce a plurality of respective counts for the memory locations if at least one strength data exceeds the threshold value, determines a difference between a maximum and a minimum value of the counts. If the difference is greater than a predetermined value, an alarm indication is given of the antenna that is mapped to the memory location of the minimum count value.

According to a third aspect, the present invention provides a diversity reception method comprising the steps of (a) receiving modulated radio-frequency signals via independent propagation paths using an array of antennas and respectively recovering information signals from the modulated signals, (b) producing strength data indicating respective strengths of the information signals, (c) selecting a highest strength signal from the information signals and allowing a connection to be established from a transmit site using the selected signal, (d) storing the strength data of the selected signal in a corresponding one of a plurality of locations of a memory, the locations being respectively mapped to the antennas, (e) repeating the steps (a) to (d) a predetermined number of times, (f) analyzing strength data stored in the memory locations, (g) if none of the strength data exceeds a threshold value, generating an alarm indication of the whole array of antennas, and (h) if there is at least one vacant memory location which contains no strength data, generating an alarm indication of the antenna mapped to the vacant location.

According to a fourth aspect, the present invention provides a diversity reception method comprising the steps of (a) receiving modulated radio-frequency signals via a plurality of independent propagation paths using an array of antennas and respectively recovering information signals from the modulated signals, (b) producing strength data indicating respective strengths of the information signals, (c) selecting a highest strength signal from the information signals and allowing a connection to be established from a transmit site using the selected signal, (d) storing the strength data of the selected signal in a corresponding one of a plurality of ii locations of a memory, the locations being respectively mapped to the antennas, (e) repeating the steps (a) to (d) a predetermined number of times, (f) comparing all strength data of the memory with a threshold value, (g) generating an alarm indication of the whole array of antennas if none of the strength data exceeds the threshold value, (h) counting strength data stored in each of the memory locations to produce a plurality of respective counts for the locations of the memory if at least one strength data exceeds the threshold value, (i) determining a difference between a maximum and a minimum value of the counts, and (j) generating an alarm indication of the antenna mapped to the memory location of the minimum count value if the difference is greater than the predetermined value.

BRIEF DESCRIPTION OF THE DRAWINGS

The present invention will be described in further detail with reference to the accompanying drawings, in which:

FIG. 3 is a flowchart of the operation of a diversity controller according to a first embodiment of the present invention; and FIG. 4 is a flowchart of the operation of a diversity controller according to a second embodiment of the present invention.

DETAILED DESCRIPTION

Figure 1:
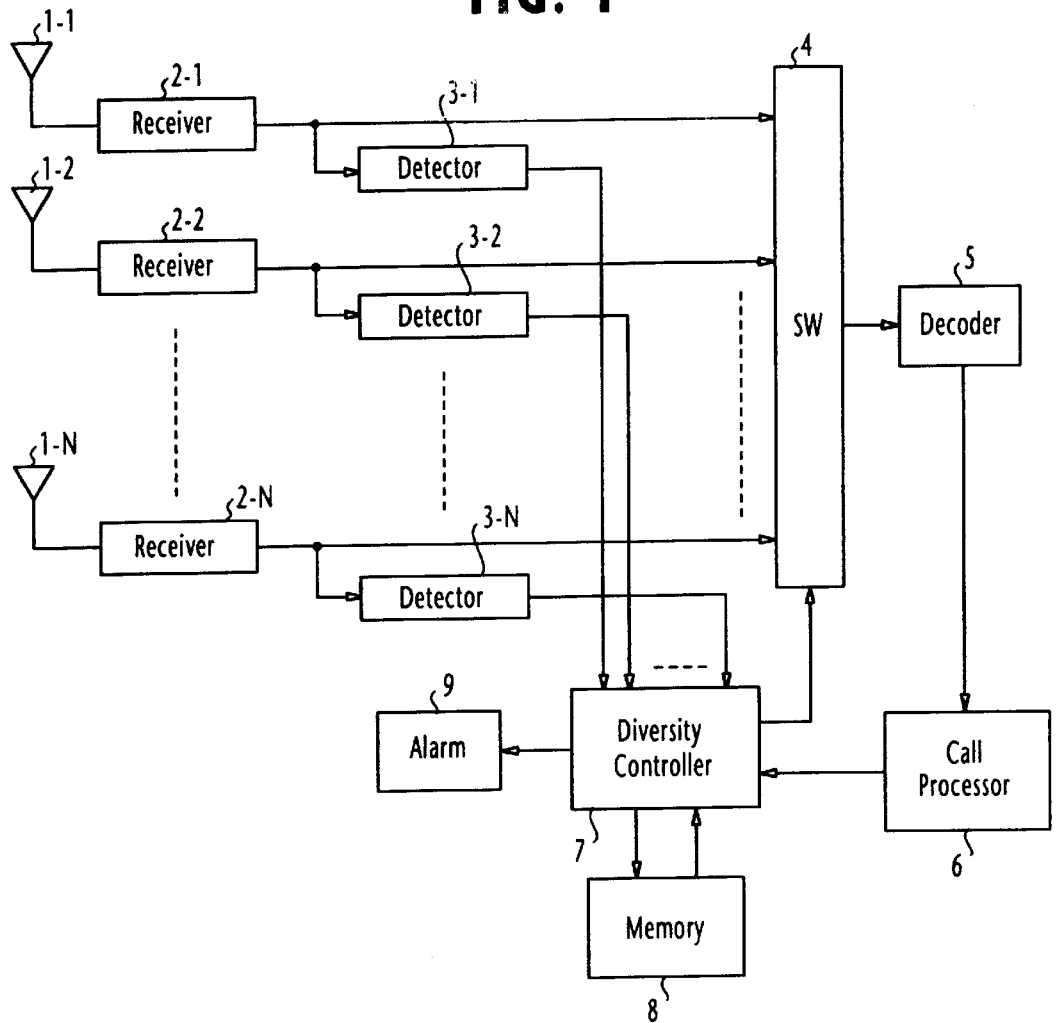
FIG. 1 is a block diagram of a diversity receiving system of the present invention.

Referring now to FIG. 1, there is shown a diversity receiving system of a cell-site base station according to the present invention. The diversity receiving system includes an array of antennas 1—1 through 1-N spaced at such intervals that the signals respectively received by the antennas are uncorrelated with each other, so that their propagation paths are said to be independent of each other. Radio-frequency receivers 2-1 through 2-N are respectively connected to the antennas 1—1 through 1-N for detecting information from a modulated carrier transmitted from mobile units. The outputs of the RF receivers are respectively connected to detectors 3-1 through 3-N where their signal strengths are detected and data representing the strength of each antenna signal is supplied to a diversity controller 7. The RF receiver outputs are further supplied to input terminals of a diversity switch 4 which connects one of the input terminals to a decoder 5.

A call processor 6 is provided for processing the output of decoder 5 to establish a call, or radio link between calling and called parties. When a call is established, the call processor indicates this fact to the diversity controller 7. Diversity controller 7 is constantly monitoring the outputs of the detectors 3-1 to 3-N to select the antenna that is receiving the highest strength signal and commands the diversity switch 4 to establish a connection between a receiver 2 associated with the selected antenna and the decoder 5.

A memory 8 is connected to the diversity controller 7 to store records of the strength data of the antennas and their associated circuitry and activates an alarm circuit 9 if a faulty condition is detected in the antenna system.

Figure 2:
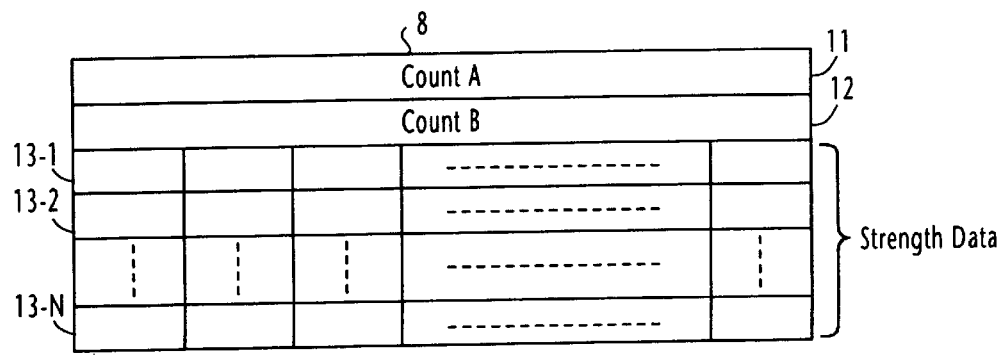
FIG. 2 is an illustration of a memory used in the diversity receiving system.

According to a first embodiment of the present invention, the memory 8 has count fields 11 and 12 and a number of memory locations 13-1 through 13-N as illustrated in FIG. 2. Diversity controller 7 stores a count value A in the count field 11 indicating the number of calls which have been established between mobile units and the base station after initialization. Memory locations 13-1 through 13-N are used for mapping the relationships between the antennas 1—1 through 1-N and strength data of the corresponding detectors 3-1 to 3-N by storing the highest strength data in one of the fields of the memory location 13 which is associated with the antenna producing that maximum strength. Diversity controller 7 further stores a count value B in the count field 12 to indicate the number of instances in which at least one strength data in memory 8 is higher than a predefined threshold value.

The operation of the diversity controller 7 according to the first embodiment of this invention will be best understood with the aid of the flowchart of FIG. 3.

The operation of the diversity controller 7 begins with initialization step 21 in which the controller 7 initializes all contents of memory 8. At step 22, the controller 7 searches through the outputs of detectors 3 for an antenna that is producing the signal of highest strength and commands the diversity switch 4 to connect the RF receiver that corresponds to the selected antenna to the decoder 5.

Flow proceeds to step 23 to check to see if the call processor 6 has established a connection between a mobile unit and the cell-site. If not, flow returns to step 22 to repeat the search for an antenna receiving the highest strength signal. If the decision is affirmative at step 23, it is determined that the connection has been established using the selected antenna and flow proceeds to step 24 to store the strength data of the selected antenna into the corresponding memory location 13 and increment the count value A in count field 11 by one (step 25). At step 26, the controller 7 compares the count A with a predefined reference count. If the count A is smaller than the reference count, flow returns from step 26 to step 22 to repeat the above process.

If the count value A is greater than the reference count, yielding an affirmative decision at step 26, the controller 7 recognizes that there is a sufficient number of strength data in the memory 8 to make an assessment of the operating performance of the whole antenna system. Controller 7 then proceeds to step 27 to compare the strength data of all memory locations 13 with a performance threshold that represents an acceptable operating performance of an antenna.

If all strength data in memory locations 13 do not exceeds the performance threshold, it is highly likely that the performance of all antennas is degrading, and flow proceeds from step 28 to step 34 to inform the alarm circuit 9 of this fact, and returns to initialization step 21.

If at least one of the antennas is functioning properly, the decision at step 28 is affirmative and flow proceeds to step 29 to increment the count value B by one.

At step 30, this count value B is compared with a predefined count value. If the count value B exceeds the predefined count, the controller 7 proceeds to step 31, recognizing that the number of connections that have been established after initialization is sufficient to individually identify antennas which are not previously selected as faulty antennas. For this purpose, the controller proceeds to step 31 for making a search through memory locations 13 for vacant locations not containing strength data. If such vacant memory locations are detected (step 32), the controller 7 proceeds to step 33 to recognize that the antennas associated with such vacant memory locations have not been previously selected and identifies these antennas as faulty antennas.

Diversity controller 7 proceeds from step 32 to step 33 to inform the alarm circuit 9 of a fault indication of the identified antennas. After execution of steps 32 and 33, flow returns to initialization step 21.

A modified embodiment of this invention is shown in FIG. 4, which differs, from the previous embodiment in that steps 31 to 33 of FIG. 3 are replaced with steps 61 to 64.

Following the affirmative decision at step 30 of FIG. 4, flow proceeds to step 61 where the controller 7 counts strength data of each of the memory locations 13-1 to 13-N and identifies the most-often selected antenna and determines its count as the maximum count value $C_{max}$ and identifies the least-often selected antenna and its count as $C_{min}$. At step 62, the controller detects the difference D between $C_{max}$ and $C_{min}$ and compares the difference with a predefined count value (step 63). If the difference D is greater than the predefined count value, it is determined that the least-often selected antenna is faulty and proceeds to step 64 to inform the alarm circuit 9 of a fault indication of the identified least-often selected antenna.

What is claimed is:

1. A diversity receiving system comprising:
   an array of antenna systems for receiving modulated radio-frequency signals via a plurality of independent propagation paths and respectively recovering information signals from the modulated signals;
   a plurality of detectors connected respectively to said antenna systems for producing strength data indicating respective strengths of the information signals;
   a diversity switch;
   call processing circuitry connected to the diversity switch for establishing a connection from a transmit site;
   a diversity controller for selecting a highest strength signal from said information signals and controlling said diversity switch to supply the selected information signal to said call processing circuitry; and
   a memory having a plurality of locations respectively mapped to said antennas,
   said diversity controller being responsive to each connection established by said call processing circuitry for storing the strength data of the selected signal in a corresponding one of the memory locations, analyzing contents of the memory locations when a predetermined number of strength data are stored therein, generating an alarm indication of the whole array of antenna systems if none of said strength data exceeds a threshold value, and generating an alarm indication of the antenna mapped to a memory location which contains no strength data if at least one strength data exceeds the threshold value.

2. A diversity receiving system comprising:
   an array of antenna systems for receiving modulated radio-frequency signals via a plurality of independent propagation paths and respectively recovering information signals from the modulated signals;
   a plurality of detectors connected respectively to said antenna systems for producing strength data indicating respective strengths of the information signals;
   a diversity switch;
   call processing circuitry connected to the diversity switch for establishing a connection from a transmit site;
   a diversity controller for selecting a highest strength signal from said information signals and controlling said diversity switch to supply the selected information signal to said call processing circuitry; and
   a memory having a plurality of locations respectively mapped to said antennas,
   said diversity controller being responsive to each connection established by said call processing circuitry for storing the strength data of the selected signal in a corresponding one of the memory locations, comparing all strength data stored in the memory locations with a threshold value when a predetermined number of strength data are stored, generating an alarm indication of the whole array of antenna systems if none of said strength data exceeds said threshold value, counting strength data stored in each memory location to produce a plurality of respective counts for the memory locations if at least one strength data exceeds the threshold value, determining a difference between a maximum and a minimum value of said counts, and generating an alarm indication of the antenna mapped to the memory location having said minimum count value if the difference is greater than a predetermined value.

3. An antenna assessment method comprising the steps of:
   a) receiving modulated radio-frequency signals via a plurality of independent propagation paths using an array of antennas and respectively recovering information signals from the modulated signals;
   b) producing strength data indicating respective strengths of the information signals;
   c) selecting a highest strength signal from said information signals and allowing a connection to be established from a transmit site using the selected signal;
   d) storing the strength data of the selected signal in a corresponding one of a plurality of locations of a memory, said locations being respectively mapped to said antennas;
   e) repeating the steps (a) to (d) a predetermined number of times;
   f) analyzing strength data stored in the memory locations;
   g) if none of said strength data exceeds a threshold value, generating an alarm indication of the whole array of antennas; and
   h) if there is at least one vacant memory location which contains no strength data, generating an alarm indication of the antenna which is mapped to said at least one vacant location.

4. An antenna assessment method according to claim 3, wherein the step (h) further comprises the step of repeating the steps (a) to (f) a predetermined number of times before generating said alarm indication if at least one of said strength data exceeds said threshold value.

5. An antenna assessment method comprising the steps of:
   a) receiving modulated radio-frequency signals via a plurality of independent propagation paths using an array of antennas and respectively recovering information signals from the modulated signals;
   b) producing strength data indicating respective strengths of the information signals;
   c) selecting a highest strength signal from said information signals and allowing a connection to be established from a transmit site using the selected signal;
   d) storing the strength data of the selected signal in a corresponding one of a plurality of locations of a memory, said locations being respectively mapped to said antennas;
   e) repeating the steps (a) to (d) a predetermined number of times;
   f) comparing all strength data of the memory with a threshold value;

g) generating an alarm indication of the whole array of antennas if none of said strength data exceeds said threshold value;

h) counting strength data stored in each of the memory locations to produce a plurality of respective counts for the locations of the memory if at least one strength data exceeds said threshold value;

i) determining a difference between a maximum value of said counts and a minimum value of said counts; and j) generating an alarm indication of the antenna mapped to the memory location of said minimum count value if the difference is greater than said predetermined value.

6. An antenna assessment method according to claim 5, wherein the step (h) further comprises the step of repeating the steps (a) to (f) a predetermined number of times before counting said strength data.

* * * * *

UNITED STATES PATENT AND TRADEMARK OFFICE
CERTIFICATE OF CORRECTION

PATENT NO. : 6,188,879 B1
DATED : February 13, 2001
INVENTOR(S) : Tomoyasu Imamura It is certified that error appears in the above-identified patent and that said Letters Patent is hereby corrected as shown below:

Column 1,
Line 14, delete "3" insert -- 2 --.

Signed and Sealed this

Sixteenth Day of October, 2001

Attest:

NICHOLAS P. GODICI
Attesting Officer    Acting Director of the United States Patent and Trademark Office